E. T. GREENFIELD.
PARACHUTE.
APPLICATION FILED JAN. 8, 1918.
1,331,705.
Patented Feb. 24, 1920.
3 SHEETS—SHEET 1.
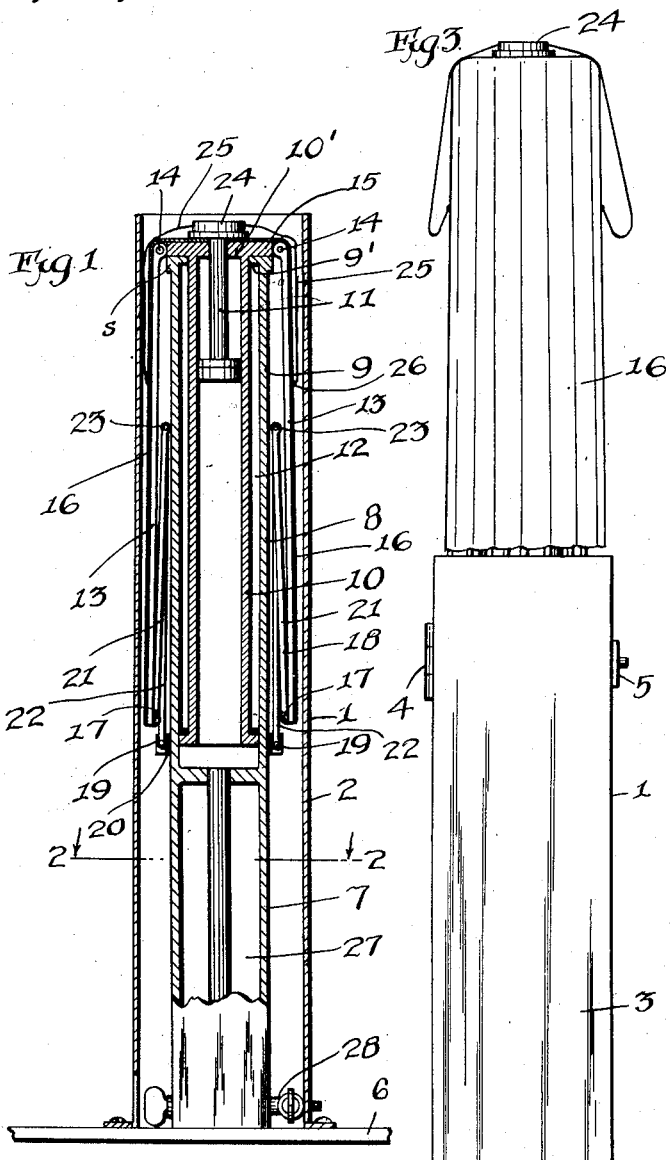
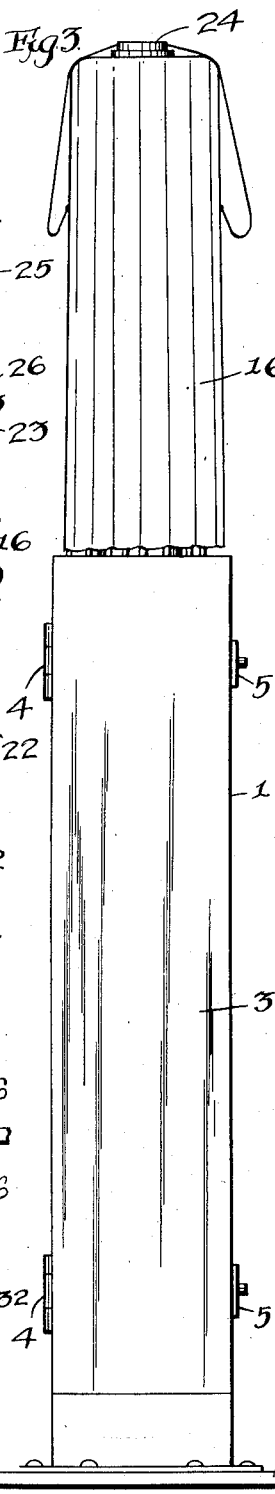
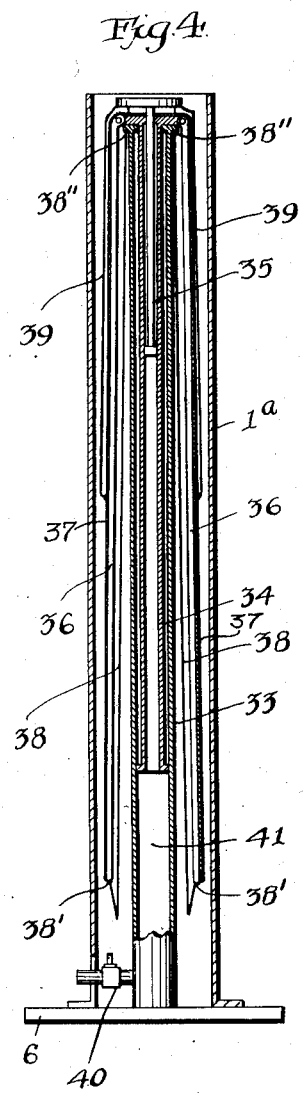
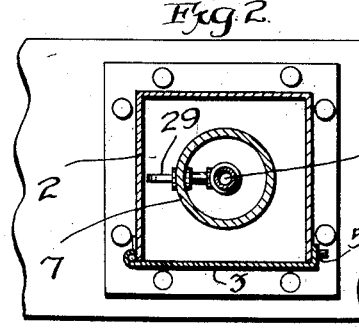
INVENTOR
Edwin T. Greenfield
BY
Kiddle & Morgan
HIS ATTORNEYS.

E. T. GREENFIELD.
PARACHUTE.
APPLICATION FILED JAN. 8, 1918.

1,331,705.

Patented Feb. 24, 1920.
3 SHEETS—SHEET 2.

INVENTOR
Edwin T. Greenfield
BY
HIS ATTORNEYS.

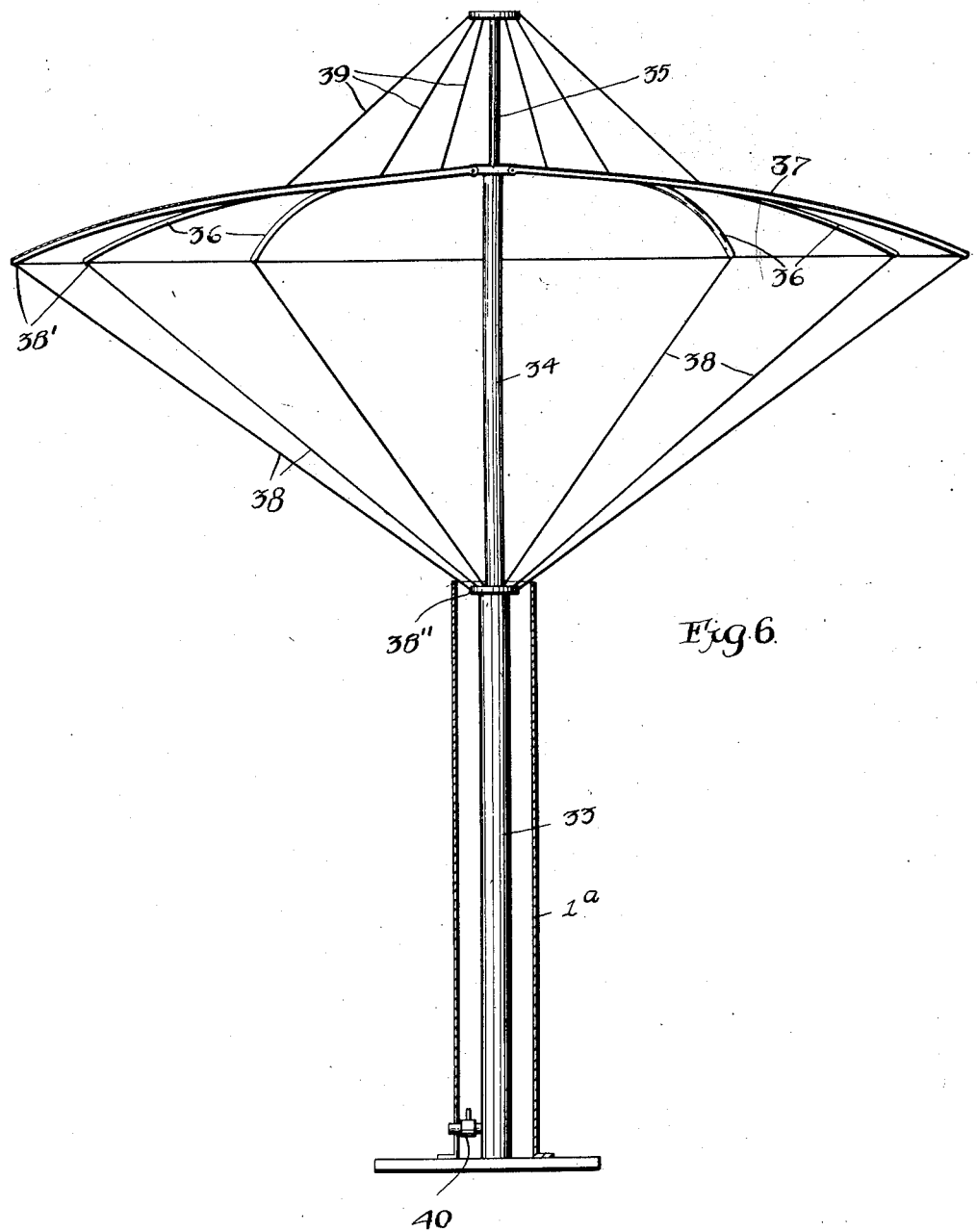

UNITED STATES PATENT OFFICE.

EDWIN T. GREENFIELD, OF YONKERS, NEW YORK.

PARACHUTE.

1,331,705.      Specification of Letters Patent.     Patented Feb. 24, 1920.

Application filed January 8, 1918. Serial No. 210,814.

*To all whom it may concern:*

Be it known that I, EDWIN T. GREENFIELD, a citizen of the United States, and a resident of Yonkers, in the county of Westchester and State of New York, have invented certain new and useful Improvements in Parachutes, of which the following is a specification.

The invention relates to parachutes and an object of the invention is to provide a parachute with means for supplying power thereto for positively opening it at will.

The parachute which is the subject of the present invention is particularly adaptable for employment on or in conjunction with aeroplanes or parts of the latter as, for example, with a removable seat carried on the aeroplane.

The parachute is provided with a tubular casing open at the top that incloses the parachute when the latter is in folded and full collapsed position but said casing is constructed so that the members of the parachute proper can be first moved upwardly out of the casing and thence opened, these movements being accomplished by the power means provided for this purpose.

As illustrating certain embodiments of the invention reference is made to the drawings forming a part of this specification and in which drawings, Figure 1 is a vertical sectional view through a tubular casing and its inclosed parachute, the latter of which is in full folded or collapsed position.

Fig. 2 is a horizontal, transverse sectional view taken as on the plane indicated by the line 2—2 of Fig. 1 looking in the direction of the arrows.

Fig. 3 is a vertical view showing the members of the parachute proper of Fig. 1 in the position which they occupy immediately after the parachute proper is moved upward out of the casing and is about to open.

Fig. 4 is a vertical sectional view through a tubular casing and its inclosed parachute, the latter of which is in full folded or collapsed position. The parachute of Fig. 4, however, differs somewhat in its details of construction from the parachute shown in Fig. 1.

In Fig. 5 the parachute is in full open or extended position.

Fig. 6 is an elevational or side view of the parachute construction shown in Fig. 4. In Fig. 6, however, the parachute is shown in full open or extended position and the tubular casing is shown in section.

Figure 5:
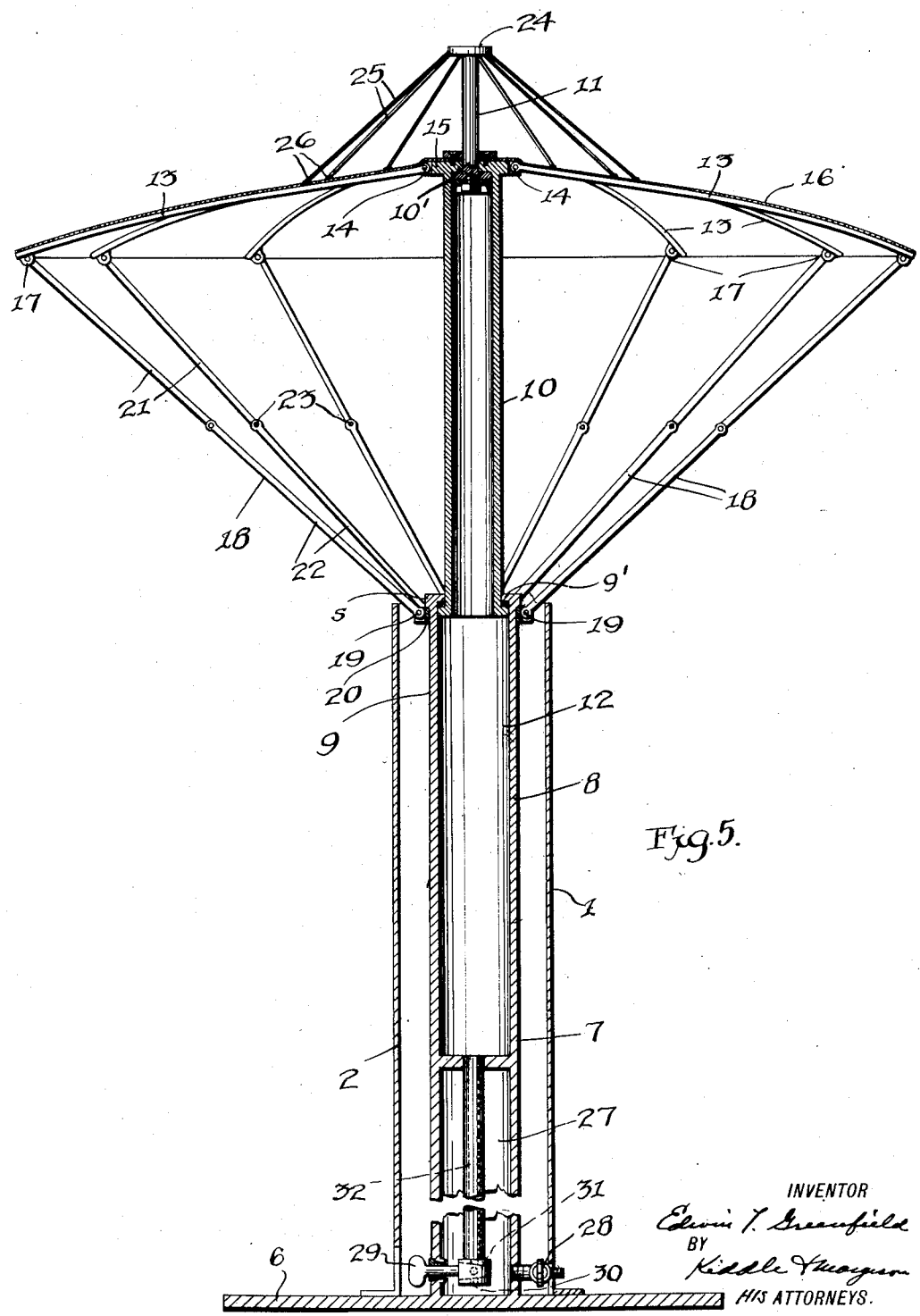
Fig. 5 is a vertical sectional view partially broken away of the parachute construction shown in Fig. 1.

The parachute construction shown in Figs. 1, 2, 3 and 5 will first be described in detail. The tubular casing is designated by 1 and includes the body or body member 2 and the door or door member 3. The door is hinged, as at 4, and can be secured in its closed position by any suitable securing means, as hasps 5. When the door is secured in closed position it completes the upright tubular casing 1. From the upper end of this casing the parachute proper can be projected, as will hereinafter appear. This tubular casing may be secured in place on any suitable member, as 6, for example a part of an aeroplane or part of a seat for an occupant. To this member 6 there is also secured the lower end 7 of a telescoping upright or standard 8 of the parachute. This telescoping upright or standard member comprises a main or body member 9 which is substantially coextensive in length with the casing. The body member 9 is an outer member of the telescoping upright or standard and into the interior of this member there extends an intermediate member 10 which member may be broadly referred to as a main upper member since it carries the parachute, and an inner or upper tip member 11. The lower exterior end of the intermediate member 10 fits and slides along the inner wall portion of an upper compartment 12 provided in the main or body member 9. Similarly, the lower end of the tip member 11 fits and slides along the inner wall portion of the intermediate member 10. The upper end of the body member 9 has a head portion 9' that approaches the exterior portion of the intermediate member 10 and serves as a guide for the latter as it moves along the body member. The upper end of the intermediate member 10 has a head portion 10' that approaches the exterior of the tip member 11 and serves as a guide for the latter as it moves along the intermediate member.

The parachute member comprises ribs 13 the inner upper ends of which are pivotally connected at 14 to an outwardly extending flange 15 at the head portion of the intermediate or main upper member 10. This member 10 thus in effect supports the parachute. The parachute member also comprises a flexible cover or casing 16 secured to the several ribs. To the lower outer ends of the ribs 13 there are connected the outer ends 17 of what may be referred to as diagonals or main tension members 18. The inner ends 19 of these diagonals or main tension members are connected to a ring 20 which can move upwardly along the body member 9 until the ring strikes the shoulder s on the body member whereby the ring and the body member operate as one when the parachute is in open position. When the ring is in said position the tension members may be considered to be in effect connected to the upper end of the main member of the standard. The main tension members 18 are made up of what may be considered as the outer tension member 21 and the inner tension member 22 which members are pivotally connected at 23 by what may be described as a jack-knife or roll-joint construction. In other words, this joint is constructed so as to permit the members 21 and 22 to assume the folded position shown in Fig. 1 or so that they can move to unfolded position as shown in Fig. 5 and will remain in said position.

The upper end 24 of the inner or tip member 11 has connected to it tension members 25, which may be referred to as auxiliary or upper tension members, which are also connected at 26 to the intermediate portion of the ribs 13. When the tip member 11 is forced upwardly a sufficient distance relative to the intermediate member it will serve to positively open the parachute member, as will hereinafter appear. At the lower end of the body member 9 there is provided a compression chamber 27 within which there is contained a volume of compressed gases, such as air or the like, that can be relied upon to supply energy, when desired, for lifting the parachute from the casing and for opening the parachute when out of the casing. The compressed air is inserted in the casing in any suitable manner as through the valve controlled inlet 28. When it is desired to use the parachute a valve 29 is turned permitting the escape of the compressed air from the chamber 27, through an opening 30, movable member 31 of the valve, and opening 32 that is in a pipe leading to the upper compartment 12 that is within the body member 9.

As the compressed air enters the upper compartment it acts first to move the intermediate member 10 upwardly and this upward movement of the intermediate member removes the parachute proper from the casing to a position where the parachute can be opened (see Fig. 3). As soon as the lower ends of the ribs of the parachute have passed upwardly beyond the upper edge of the casing the inner or tip member 11 is moved upwardly relative to the intermediate member and begins to perform its function of opening the parachute, the inner tip member accomplishing this through the medium of the auxiliary tension members 25 that are connected to the intermediate portions of the ribs. The compressed air which is released from the chamber 27 is sufficient to cause the parts to assume the unfolded or extended position shown in Fig. 5. It will thus be seen that the compressed air which is provided within the chamber or compartment 27 at the lower end of the body member 9 provides the energy for positively lifting the parachute proper from the inclosing casing and for opening the parachute as soon as it is out of the casing. Said casing is provided with the door heretofore described in order to facilitate the insertion or replacement of the parachute proper in the casing, where the parachute is ordinarily located, said casing protecting the parachute against flapping or from being wind-whipped while in folded position on the aeroplane.

Reference will now be made to the form of parachute shown in Figs. 4 and 6. In these figures the tubular casing is designated by 1ª and the outer body member, the intermediate or main upper member, and the outer or tip member of the telescoping upright or standard are respectively designated as 33, 34 and 35. The ribs of the parachute are designated 36, the casing secured to the ribs as designated 37, and the diagonals or main tension members are designated 38. The diagonals 38 are in the form of flexible cords the outer ends 38' of which are connected to the outer ends of the ribs 36 while the inner ends 38" of the diagonals 38 are connected at or adjacent to the upper end of the outer body member 33. The upper end of the tip member 35 is connected by a set of auxiliary or upper tension members 39 to the intermediate portion of the ribs 36 of the parachute.

When it is desired to use the parachute so as to perform its usual functions compressed air from any suitable source is allowed to flow past valve 40 into the compartment 41 of the body member 33. The air which enters the compartment 41 is of sufficient pressure to first lift the intermediate member 34 to a position where the parachute proper is without the casing whereby the tip member 35 can come into play to perform its function of positively opening the parachute so that the parts will occupy the position shown in Fig. 6.

It will be observed that the parachute shown in Figs. 1, 2, 3 and 5 is similar in its construction and mode of operation to the parachute shown in Figs. 4 and 6 but that certain minor details of construction in the two parachutes differ slightly from each other. For example, one of the parachutes employs pivotally connected members for the diagonal or main tension members while the other employs flexible cords for this purpose. In one of the constructions, as shown in Figs. 1, 2, 3 and 5, the chamber for the compressed air is within the upright or standard whereas in the other constructions, as shown in Figs. 4 and 6, the supply of compressed air is outside of the standard.

It will also be noted that the operator by merely turning a single valve brings into operation a mechanism or means for lifting the parachute proper from a folded position within a casing to a position above the upper edge of the casing and also a mechanism or means for positively opening the parachute after it has been lifted from the casing. The means in question comprises the several telescoping members of the standard which are caused to assume the extended position shown, for example, in Figs. 5 or 6, when a supply of compressed air or other suitable gaseous fluid is forced into the compartments containing said telescoping members.

The improvements herein set forth are not limited to the precise construction and arrangement shown and described for they may be embodied in various forms and modifications without departing from the spirit and scope of the invention.

What I claim is:

1. In combination, a parachute, a tubular casing inclosing the parachute, compressed air means for lifting the parachute from the casing, and for positively opening the parachute.

2. In combination, a parachute, a tubular casing inclosing the same, telescoping members within said casing and secured to the parachute and means for supplying compressed air to the interior of said casing to extend the telescoping members and to positively open the parachute.

3. In combination, a casing, a standard comprising telescoping members one of which is a main member and the other a movable member, a parachute, parachute ribs the inner ends of which are connected to the movable member, and main tension members connecting the other end of said ribs to the main member, all of said parts being inclosed within the casing.

4. In combination, a casing, a parachute having ribs, a standard having telescoping members one of which is a main member and the other of which is a movable member, and means for supplying compressed air to the interior of one of said standard members whereby they will assume an extended position relative to each other and thereby positively open the parachute, the movable standard member having connected thereto the inner ends of the ribs of the parachute, said parachute being provided with main tension members so as to hold the ribs when the parachute is open and in use.

5. In combination, a parachute having ribs, a cover secured thereto, main tension members, and a telescoping upright or standard comprising a main or body member, an intermediate member and a tip member, the ends of the ribs being connected to the intermediate member and the inner ends of the tension members being connected to the main or body member, and upper tension members connected to the ribs and to the upper end of the tip member.

6. In combination, a parachute having ribs, a cover secured thereto and main diagonals secured to the outer ends of said ribs, a telescoping standard comprising a main member, an intermediate member and a tip member, valve controlled means for supplying compressed air to the interior of said standard, the upper inner ends of the ribs being connected to the intermediate member and the inner ends of the diagonals being connected to the main member, and auxiliary or upper diagonals connected to the top of the tip member and to the intermediate portions of the ribs.

7. In combination, a parachute comprising ribs, a cover secured to the ribs, tension members secured to the outer, lower ends of the ribs, an upright or standard to which the inner ends of said ribs are connected and to which standard the inner ends of said tension members are connected, a tip member the upper end of which extends above the top of the parachute, upper tension members extending from the upper end of the tip member to the intermediate portions of the ribs so that as the tip member is forced upwardly the parachute will be forced open, and means for forcing the tip member upwardly along the standard.

8. In combination, a parachute and a standard therefor comprising a lower body member, an intermediate member, and a tip member which telescope, the lower body member having therein a chamber within which compressed air is stored and provided with a valve for permitting the escape of the compressed air whereby it can cause the telescoping members to assume an extended position relative to each other, the tip member being connected to the parachute so that it serves as a part of a means for positively opening the parachute when it has been lifted.

Specification signed and witnessed this 5th day of January, A. D., 1918.

EDWIN T. GREENFIELD.

Signed in the presence of—
EDWIN A. PACKARD,
HENRY T. HORNIDGE.